Patented Jan. 9, 1945

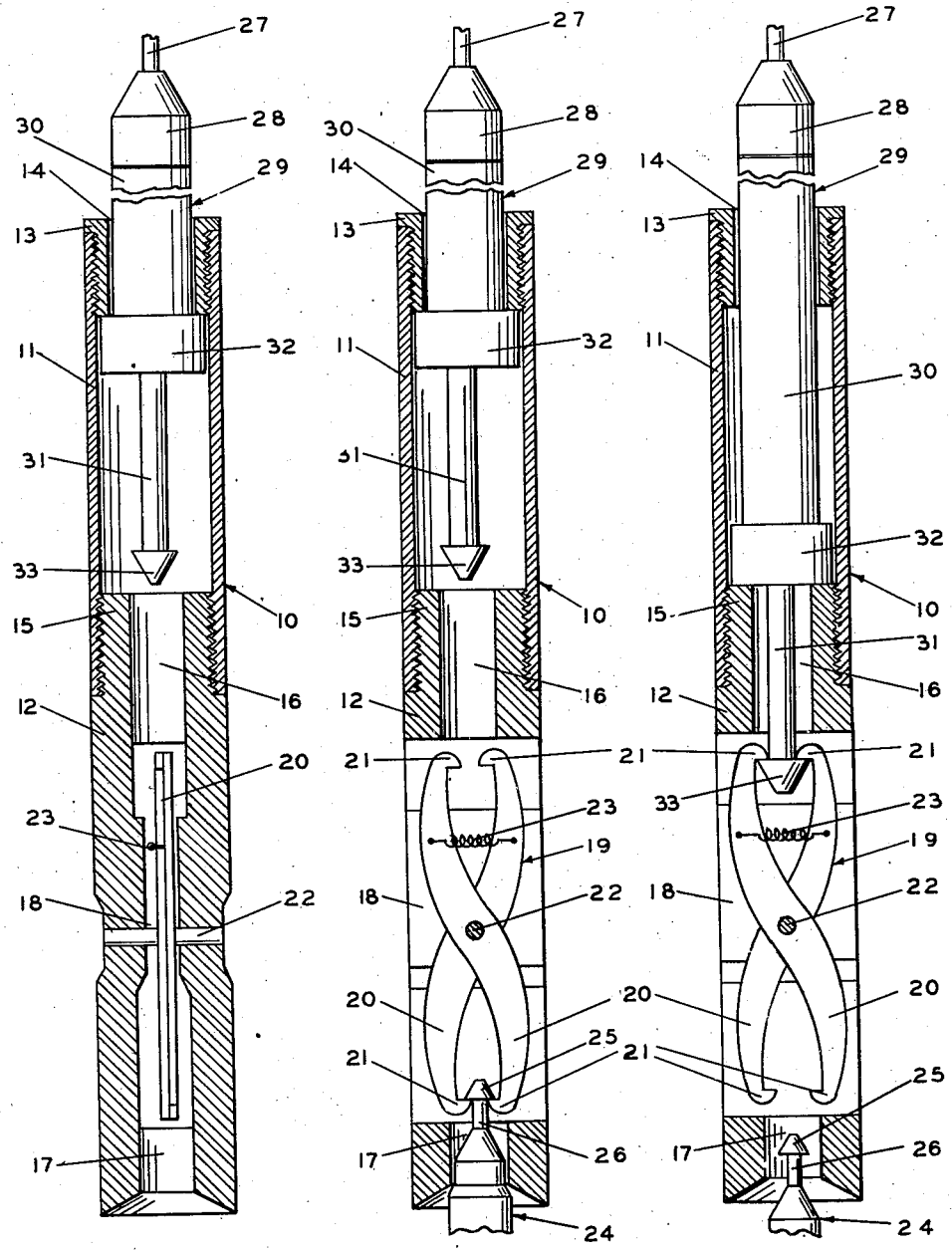

2,366,982

UNITED STATES PATENT OFFICE 2,366,982

INSTRUMENT RELEASE

Robert C. Pryor, Bartlesville, Okla., assignor to Phillips Petroleum Company, a corporation of Delaware Application August 30, 1943, Serial No. 500,590

4 Claims. (Cl. 294—116)

This invention relates to a releasing device and is particularly adaptable for use in lowering various tools, including well logging instruments and the like, into a well bore and releasing the same upon arrival at the bottom of the well bore without jarring or in any way damaging the tool or instrument thus released.

It is essential in lowering and releasing certain instruments such as those employed in the logging of well bores that care be taken not to damage the delicate parts thereof by subjecting the same to impact loads. A number of attempts have been made to provide suitable devices for this purpose, but all of the devices used for this purpose heretofore have been more or less inherently unsuitable. Among the instrument releasing devices known in the past have been those which are operated by a "go-devil," those operated by the shearing of one or more pins, and those operated by imparting a jar to the lowering mechanism and thence to the instrument itself. All of the foregoing types of mechanisms are unsuitable for their intended purpose since the impacts imparted to the instrument oftentimes damage the same, thereby causing operating failures and necessitating costly repairs.

The device of the present invention obviates the objections experienced in the past and provides a simple apparatus whereby an instrument or tool may be readily and positively coupled thereto, lowered through a well bore, released from the instrument when the same comes to rest at the bottom of the well bore, and then retrieved to the surface of the ground.

It is the primary object of this invention to provide a device for disposing a tool or instrument in a well bore and then releasing said tool or instrument without jarring the same.

This invention has for another object the lowering of an instrument downwardly through a well bore and then releasing the same upon arrival at the bottom of the well bore without subjecting the instrument to any undesirable shock or impact loads.

Another object of this invention is the provision of a device of the character indicated which is simple in design, rugged in construction, and relatively inexpensive in initial and maintenance costs.

These and other objects and advantages of the instant invention will be readily apparent to persons skilled in the art by reference to the following detailed description and annexed drawing, which respectively describe and illustrate a preferred embodiment of the invention, and wherein Figure 1 is an elevation view of the apparatus of this invention partly in central cross section;

Figure 2 is an elevation view partly in central cross section taken 90° about the vertical axis of Figure 1 and illustrating the device coupled to a tool or instrument; and Figure 3 is the same as Figure 2 and illustrates the relative position of the parts immediately after the device of the invention has been operated to release the well tool or instrument therefrom.

In the drawing, reference numeral 10 generally denotes a housing consisting of a cylindrical upper member 11 and a latch supporting lower member 12. Upper member 11 is internally threaded at each end to receive a threaded plug 13, having a central passage 14, and the upper end portion 15 of member 12 at opposite ends thereof. Member 12 is provided with an upper central passage 16 and a lower central passage 17, both of the two last mentioned passages communicating with a through slot 18. Disposed within through slot 18 and spaced from the side walls thereof is a double tong, pincer, or latch device generally indicated by reference numeral 19 and consisting of a pair of legs 20 which are preferably identical and interchangeable, each of said legs being provided with a prong or jaw 21 at each end. The legs of the latch device are hinged or pivoted on a pin 22 which is supported by the walls of slot 18. A tension spring 23 is connected to the upper portion of each leg 20 and normally urges the legs and the corresponding pairs of prongs toward the central axis of the device or into closing position.

The upper part of an instrument or tool, which is to be disposed at the bottom of a well bore or similar passage, is indicated by numeral 24 and includes a spear head 25 extending upwardly of a neck portion 26.

Turning next to the upper portions of the figures of the drawing, it will be observed that I have denoted a wire line or cable 27 that is anchored in a socket 28, which is in threaded engagement with or otherwise coupled to a plunger generally represented by numeral 29. Plunger 29 may, if desired, be fabricated in a single unit machined on several diameters to obtain an upper plunger portion 30 that is freely slidable in passage 14, a lower plunger or neck portion 31 that is freely slidable in passage 16 and having a diameter somewhat greater than the largest diameter of head 25 of the instrument, and an intermediate plunger portion 32 freely slidable in cylindrical member 11. The lower extremity of plunger portion 31 terminates in a head 33 that may be the same as or similar to head 25 of instrument 24. It will be observed that the lower end of plug 13 limits the upward travel of plunger 29 with respect to housing 10 (Figures 1 and 2) and that the upper end of member 12 limits the downward travel of plunger 29 relative to housing 10 (see Figure 3).

For the purpose of outlining the operation of my invention, let us consider the portions of the latch device above the center line of pivot pin 22 as constituting an upper latch arrangement and the portions below the center line of pivot pin 22 as constituting a lower latch arrangement. The apparatus is assembled into a unitary structure at the surface of the ground and plunger 29 is raised to the position shown in Figures 1 and 2, namely, in its uppermost position. The head 25 and neck 26 of instrument 24 is then inserted in lower passage 17 and moved upwardly therethrough until said head 25 urges the jaws of the lower latch arrangement outwardly with respect to each other against the action of spring 23 and jaws 21 of the lower latch arrangement engage neck 26. It will be observed that spring 23 urges the lower jaws into firm engagement with said neck 26 as shown in Figure 2. The instrument and entire device are then lowered through the well bore by means of cable 27 until the instrument comes to rest at the bottom of the well bore. Plunger 29 is of sufficient mass to permit continued downward movement thereof through the housing with the result that lower plunger portion 31 and head 33 move downwardly through the housing until said head 33 contacts the jaws of the upper latch arrangement. Fluid in the well bore is free to enter cylindrical member 11 and serves to absorb any shock loads that might otherwise be imparted to other parts of the device, upon downward movement of plunger 29 with respect to the housing. Continued downward movement of plunger 29 causes head 33 to spread the upper jaws until the same attain the position illustrated in Figure 3, whereby the double latch device is opened against the action of spring 23 and the lower jaws are placed out of engagement with instrument 24. It will be noted that, by virtue of lower plunger portion 31 being of greater diameter than any diameter of head 25 and by virtue of the positive engagement of the upper jaws with plunger 29, the lower jaws are maintained out of engagement with instrument 24, and the instrument is thereby released. The housing and appurtenances are then raised through the well bore free of the instrument (see Figure 3). Upon arrival at the surface of the ground, plunger 29 may be disengaged from the double latch device by inserting a suitable tool through passage 17 and extending the legs and jaws further apart. The device will then be ready for reuse.

From the foregoing, it is believed that the construction, operation and advantages of my present invention will be readily comprehended by persons skilled in the art. It is to be clearly understood, however, that various changes in the apparatus, herewith shown and described, may be resorted to without departing from the spirit of the invention, as defined by the appended claims.

I claim:

1. A device of the character described comprising a housing adapted to be lowered into a well bore, a substantially vertical cylinder in the housing, an opening in the housing below the cylinder and communicating therewith, latch means in the opening and including pin means secured to the housing and a pair of generally upwardly disposed crossed members independently pivoted to the pin means and so constructed and arranged as to form an interdependent pair of pincers constituting an upper pincer and a lower pincer, the lower pincer being adapted to releasably grip a tool, a plunger movable downwardly in the cylinder and into the upper pincer whereby both pincers are simultaneously actuated and the tool is adapted to be disengaged from the lower pincer, and means within the cylinder for limiting the downward movement of the plunger in the cylinder.

2. A device of the character described comprising a housing adapted to be lowered into a well bore, a substantially vertical cylinder in the housing, an opening in the housing below the cylinder and communicating therewith, latch means in the opening and including pin means secured to the housing and a pair of generally upwardly disposed crossed members independently pivoted to the pin means and so constructed and arranged as to form an interdependent pair of pincers constituting an upper pincer and a lower pincer, means for normally urging each pincer in the direction of closing position, the lower pincer being adapted to releasably grip a tool, a plunger movable downwardly in the cylinder and into gripping engagement with the upper pincer against the action of the last mentioned means whereby both pincers are simultaneously actuated and the tool is adapted to be disengaged from the lower pincer, and a stop in the lower end of the cylinder for limiting the downward movement of the plunger in the cylinder.

3. A device of the character described comprising a housing adapted to be lowered into a well bore, a substantially vertical cylinder in the housing, an opening in the housing below the cylinder and communicating therewith, a passage in the lower portion of the housing communicating with the exterior thereof and with the opening, said passage being in substantial axial alignment with the cylinder and being adapted to receive at least a portion of a well tool, latch means in the opening and including pin means secured to the housing and a pair of generally upwardly disposed crossed members independently pivoted to the pin means and so constructed and arranged as to form an interdependent pair of pincers constituting an upper pincer and a lower pincer, means for normally urging each pincer in the direction of closing position, the lower pincer being adapted to releasably grip the tool, and a plunger movable in the cylinder and into gripping engagement with the upper pincer against the action of the last mentioned means whereby both pincers are simultaneously actuated and the tool is adapted to be disengaged from the lower pincer.

4. A device of the character described comprising a housing adapted to be lowered into a well bore, a substantially vertical cylinder in the housing, an opening in the housing below the cylinder and communicating therewith, a passage in the lower portion of the housing communicating with the exterior thereof and with the opening, said passage being in substantial axial alignment with the cylinder and being adapted to receive at least a portion of a well tool, latch means in the opening and including pin means secured to the housing and a pair of generally upwardly disposed crossed members independently pivoted to the pin means and so constructed and arranged as to form an interdependent pair of pincers constituting an upper pincer and a lower pincer, means for normally urging each pincer in the direction of closing position, the lower pincer being adapted to releasably grip the tool, a plunger movable downwardly in the cylinder and into gripping engagement with the upper pincer against the action of the last mentioned means whereby both pincers are simultaneously actuated and the tool is adapted to be disengaged from the lower pincer, and means within the cylinder for limiting the downward movement of the plunger in the cylinder.

ROBERT C. PRYOR.